Sept. 2, 1924.

W. B. DOYLE

GRAIN SEPARATOR

Filed June 27, 1921  2 Sheets-Sheet 1

INVENTOR.
W. B. Doyle
BY Hazard & Miller
ATTORNEYS

Sept. 2, 1924.
W. B. DOYLE
1,507,109
GRAIN SEPARATOR
Filed June 27, 1921   2 Sheets-Sheet 2
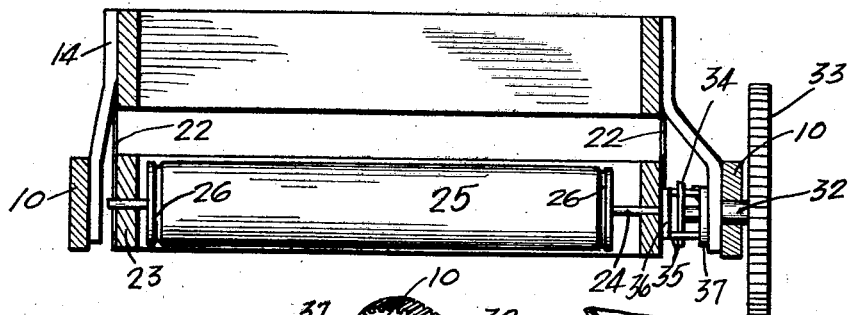
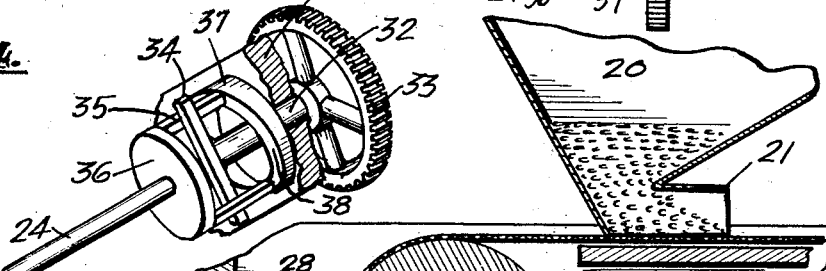
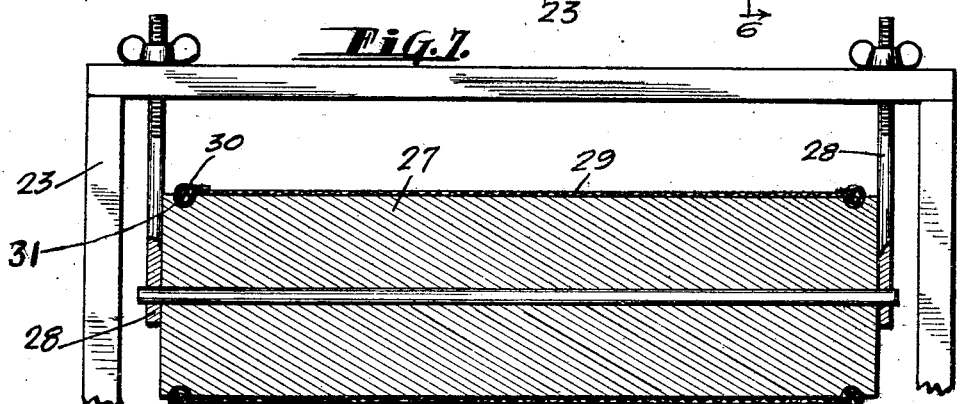
INVENTOR.
W. B. Doyle
BY
Hazard & Miller
ATTORNEYS.

Patented Sept. 2, 1924.

1,507,109

UNITED STATES PATENT OFFICE.

WILLIAM B. DOYLE, OF ARAGO, OREGON.

GRAIN SEPARATOR.

Application filed June 27, 1921. Serial No. 480,591.

*To all whom it may concern:*

Be it known that I, WILLIAM B. DOYLE, a citizen of the United States, residing at Arago, in the county of Coos, State of Oregon, have invented new and useful Improvements in Grain Separators, of which the following is a specification.

My invention relates to a grain separator, and has for its principal object the provision of relatively simple and efficient means for rapidly and economically handling mixed grains, and effecting the separation of the different varieties of grain from the general mixture, and the form of apparatus herein disclosed is particularly designed for separating substantially round or spherical seeds or grain berries from seeds or grain berries having elongated bodies.

Further objects of my invention are to generally improve upon and simplify the construction of the existing types of grain separators and to provide a construction wherein the separating action depends upon gravity together with a lateral vibratory movement of the grain supporting surface.

With the foregoing and other objects in view, my invention consists in certain novel features of construction and arrangement of parts that will be hereinafter more fully described and claimed and illustrated in the accompanying drawings, in which:

Fig. 3 is a vertical section taken approximately on the line 3—3 of Fig. 1.

Fig. 4 is a perspective view of the mechanism utilized for imparting lateral vibratory movement to the grain carrying members.

Fig. 5 is an enlarged detail section taken approximately on the line 5—5 of Fig. 2.

Fig. 6 is an enlarged detail section taken approximately on the line 6—6 of Fig. 5.

Fig. 7 is a horizontal section taken approximately on the line 7—7 of Fig. 5.

Referring by numerals to the accompanying drawings which illustrate a practical embodiment of my invention, 10—10 designate the side rails of a substantially rectangular framework that serves as a support for the operating parts of a separator, said framework including vertically disposed corner posts 11. Arranged in the lower portion and at the rear end of this framework is a receptacle 12 for the substantially round or spherical seeds or grain berries, and arranged at the front of the framework is a receptacle 13 for the seeds or grain berries having elongated bodies.

Figure 1:
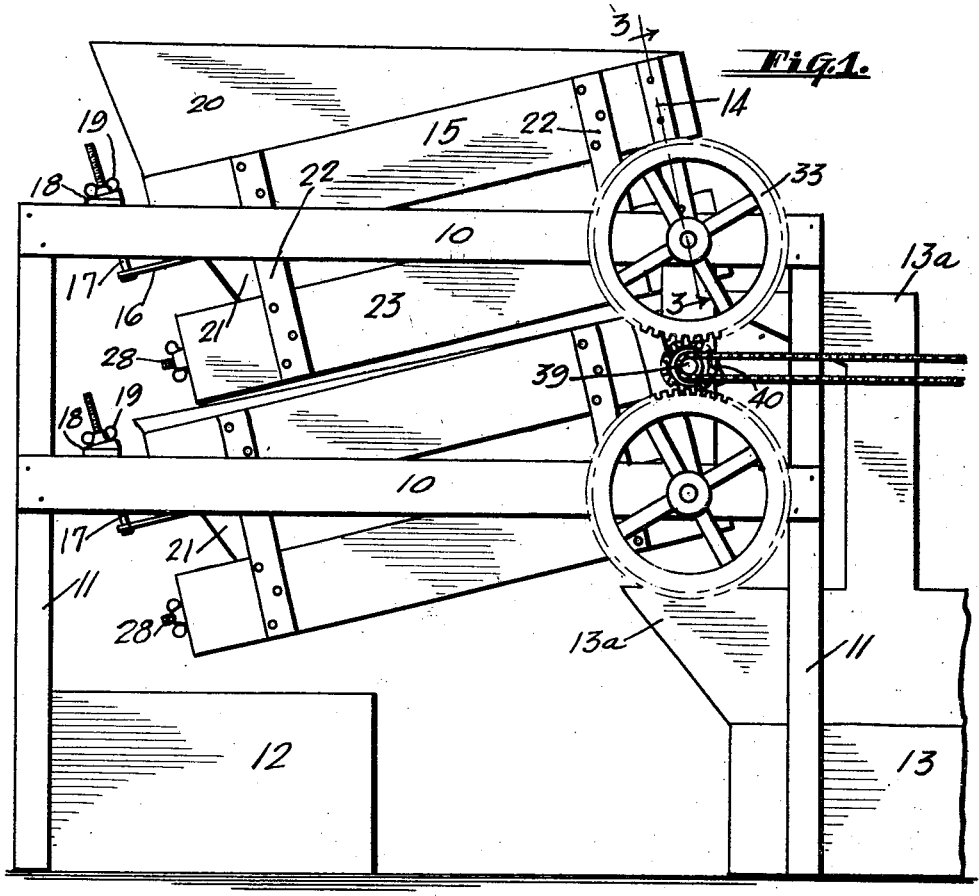
Figure 1 is a side elevational view of a grain separator of my improved construction.
Figure 2:
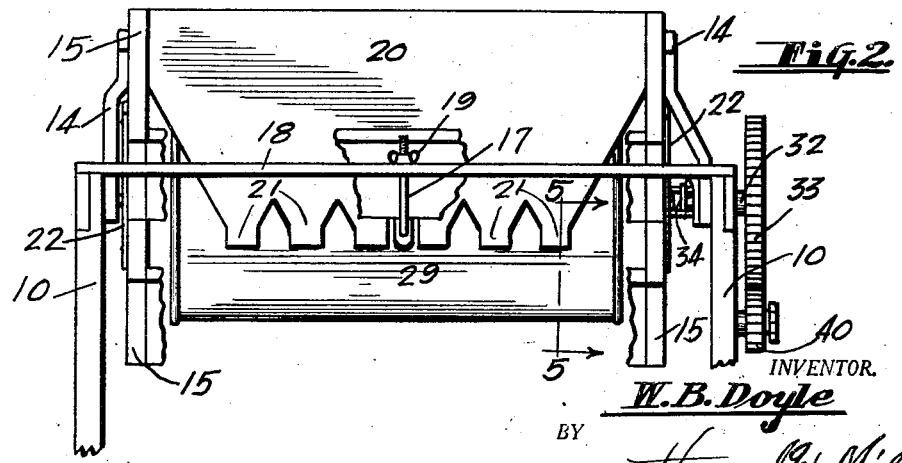
Fig. 2 is a rear elevational view of the upper portion of the separator with parts thereof broken away in order to more clearly illustrate the construction of the device.

In Fig. 1 of the drawings I have illustrated the machine as being provided with two separating units, and where such construction is employed one unit is arranged directly above the other. Inasmuch as the units are identical in size and form, the construction of but one unit will be hereinafter described.

Pivotally mounted at suitable points near the forward ends of the upper pair of side rails 10 are the lower ends of upwardly projecting bars 14, the upper ends thereof being rigidly fixed in any suitable manner to the forward ends of the side rails of a substantially rectangular frame 15 that is maintained in an inclined position and with its forward end elevated with respect to its rear end.

In order to vary the angular position of this frame, a plate 16 projects rearwardly from the rear end of said frame, and swiveled in said plate is the lower end of an adjusting rod 17 that passes upwardly through a cross bar 18 on the rear portions of rail 10, the threaded upper portion of said rod receiving a wing nut 19.

Supported by the rear portion of the frame 15 is a hopper 20 that receives the grain that is to be separated, and the lower end of said hopper terminates in a series of forwardly projecting spaced discharge spouts 21 having open forward ends and bottoms. Secured in any suitable manner to the side rails of frame 15 are the upper ends of hangers 22 that are preferably formed of thin resilient metal, such as steel, and carried by the lower ends of these hangers is a substantially rectangular frame 23 that occupies an inclined position parallel with inclined frame 15.

Journaled in suitable bearings in the forward portion of frame 23 are the trunnions 24 of a roller 25 that is provided adjacent its ends with circumferential grooves 26, and a similar roller 27 has its trunnions journaled in the forward ends of rods 28 that are adjustably arranged on the rear rail of frame 23. Mounted for operation upon the rollers 25 and 27 is an endless belt 29 preferably of canvas, and arranged in the hems at the sides thereof are flexible members, such as cords or cables 30, and which latter operate in the grooves 26 in roller 25 and similar grooves 31 that are formed in roller 27. The members 28 are adjustably seated in the rear rail of frame 23 in order that the proper tension may be maintained in belt 29.

Journaled in one of the side rails 10 of the main frame of the machine and at a point directly opposite the forward portion of frame 23 is a short shaft 32 on the outer end of which is fixed a gear wheel 33, and fixed on the inner end of this shaft 32 is a cross arm 34 that is adapted to engage studs or fingers 35 that project outwardly from a disc 36, which latter is fixed in any suitable manner to the adjacent end of shaft 24 (see Fig. 4). Secured in any suitable manner to the inner face of side rail 10 of the frame and concentrically disposed about shaft 32 is a ring 37 having an inclined or beveled cam face 38 against which bears the free ends of the fingers 35 of disc 36. Under normal conditions, or while the fingers 35 are on the low portion of this cam face 36, the spring hangers 22 occupy substantially vertical positions, as illustrated in Fig. 3, and when said fingers are engaged by the high portion of the cam, the frame 23 will be shifted laterally a slight distance against the resistance afforded by said spring hangers, the resiliency of the latter returning said frame 23 to its normal position as the fingers 35 ride onto the low face of the cam.

Journaled in a suitable bearing on the frame of the machine is a stub shaft 39 on which is fixed a pinion 40 that meshes with gear wheel 33, said stub shaft also carrying a belt or sprocket wheel whereby it may be driven from a suitable motor. Where the grain separator is provided with two separating units arranged one above the other, as illustrated in Fig. 1, the driving means including the pinion 40 is preferably positioned between the gear wheels 33 so that one driving connection operates both units.

In the operation of my improved grain separator, the body of grain to be separated is delivered into the hopper 20 and discharges therefrom in substantially parallel rows through the open bottomed spouts 21 directly onto the lower end of the over-running portion of belt 29. The rotary motion of driving pinion 40 is transmitted through gear wheel 33 to shaft 32, and thence to shaft 24 that carries roller 25 through cross bar 34, fingers 35, and disc 36 which latter is fixed to said shaft 24.

Thus, belt 29 is operated to carry the grain in rows from the spouts 21 in an upward direction through frame 23, and simultaneously with the travel of the belt said frame 23 will be vibrated laterally through the cooperation of fingers 35, cam 37, and the resilient hangers 22. This vibration of frame 23 and the belt 29 operating therein will effect a comparatively rapid spreading and separation of the substantially spherical seeds or berries of grain from those seeds or grain berries having elongated bodies, with the result that the substantially spherical seeds and grain berries will rapidly travel downwardly over the rear portion of the belt and discharge from the rear lower end thereof downwardly into receptacle 12, while the seeds and grain berries having the elongated bodies will, as a result of the vibration of the endless belt or carrier, assume positions with their axes substantially parallel with the length of the belt in which positions they will roll, first in one direction and then in the other transversely of the belt but will maintain their positions longitudinally of the belt or carrier and be carried thereby upwardly over the upper roller 25 and finally be discharged into chutes or hoppers 13$^a$ that lead directly into receptacle 13. Upon reference to Fig. 5, it will be noted that the spouts 21 are substantially in contact with the belt so that the grain will be fed onto the belt in parallel rows and as they pass from within the spouts under the travel of the belt they will be subjected to the transverse vibration of the belt so that the rows will be widened and spread and the body of seed upon the belt reduced in height so that the stream of seeds will be considerably thinned. I thus accomplish a separation and spreading of the seeds more quickly and easily than if the hopper discharged onto the belt through a single opening coextensive in width with the belt.

Thus it will be seen that I have produced a comparatively simple machine that requires relatively little power in its operation, and which may be economically employed in the rapid separation of substantially spherical seeds or grain berries from seeds or grain berries having elongated bodies.

It will be understood that minor changes in size, form and construction of the various parts of my improved grain separator may be made and substituted for those herein shown and described without departing from the spirit of my invention, the scope of which is set forth in the appended claims.

I claim as my invention:

1. In a grain separator, an endless belt aranged for operation in an inclined plane, means for operating said belt including a shaft, and means for imparting lateral vibratory movement to said belt comprising fingers rigidly sustained on said shaft, a stub shaft, a cross arm secured to the stub shaft and engaging said fingers, a fixed cam engaging said fingers, and means for rotating said stub shaft whereby said fingers and cross arm cooperate to effect the driving of the first shaft, and said fingers and cam cooperate to effect a reciprocating movement of said shaft.

2. In a grain separator, an endless belt arranged for operation in an inclined plane, means for operating said belt including a shaft, and means for imparting vibratory movement to said belt comprising a disk fixed to said shaft, fingers extending laterally from the disk, a stub shaft, a cross arm fixed to the stub shaft and engaging said fingers, a fixed ring cam engaging the ends of said fingers, and means for rotating said stub shaft.

In testimony whereof I have signed my name to this specification.

WILLIAM B. DOYLE.